United States Patent
Mondal (10) Patent No.: US 10,325,013 B2
(45) Date of Patent: Jun. 18, 2019

(54) METHOD OF OPTIMIZING SPACE UTILIZATION IN A DOCUMENT AND A SPACE OPTIMIZATION SYSTEM THEREOF

(71) Applicant: WIPRO LIMITED, Bangalore (IN)

(72) Inventor: Sumanta Mondal, Kolkata (IN)

(73) Assignee: Wipro Limited, Bangalore (IN)

(*) Notice: Subject to any disclaimer, the term of this patent is extended or adjusted under 35 U.S.C. 154(b) by 0 days.

(21) Appl. No.: 15/475,236

(22) Filed: Mar. 31, 2017

(65) Prior Publication Data

US 2018/0232345 A1    Aug. 16, 2018

(30) Foreign Application Priority Data

Feb. 16, 2017   (IN) .............................. 201741005559

(51) Int. Cl.
| | |
|---|---|
| *G06F 17/00* | (2019.01) |
| *G06F 17/22* | (2006.01) |
| *G06F 17/24* | (2006.01) |
| *G06F 17/21* | (2006.01) |
| *G06F 16/93* | (2019.01) |
| *G06F 16/9535* | (2019.01) |

(52) U.S. Cl.
CPC .......... *G06F 17/2294* (2013.01); *G06F 16/93* (2019.01); *G06F 16/9535* (2019.01); *G06F 17/212* (2013.01); *G06F 17/248* (2013.01)

(58) Field of Classification Search
CPC .. G06F 17/212; G06F 17/2294; G06F 17/248; G06F 17/30867
USPC ........................................ 715/244, 246, 255
See application file for complete search history.

(56) References Cited

U.S. PATENT DOCUMENTS

| | | | |
|---|---|---|---|
| 7,028,255 B1* | 4/2006 | Ayers ..................... | G06Q 10/10 715/202 |
| 7,581,169 B2* | 8/2009 | Thomson ............... | G06F 17/289 715/223 |
| 8,429,517 B1* | 4/2013 | Damera-Venkata ........................ | G06F 17/248 715/205 |
| 9,152,616 B2* | 10/2015 | Ying ................... | G06F 17/2247 |
| 9,330,065 B2* | 5/2016 | Damera-Venkata ........................ | G06F 17/248 |

(Continued)

OTHER PUBLICATIONS

McDonald et al., The Regenstrief Medical Record System: A Quarter Century Experience, Elsevier 1999, pp. 225-253.*

(Continued)

*Primary Examiner* — Cong-Lac Huynh
(74) *Attorney, Agent, or Firm* — Finnegan, Henderson, Farabow, Garrett & Dunner, LLP (57) ABSTRACT

Systems and methods for optimizing space utilization in a document are described. The system receives a template divided into static space, dynamic space, and whitespace. The system fetches static contents, dynamic contents, personalized contents. The system determines the sizes of the contents and spaces available in the template. Further, the system compares the sizes of the contents with their respective spaces of the template. Based on the comparison, the system may resize at least one of the contents and the spaces relative to each other. Based on the comparison, the system may populate the contents inside the spaces without compromising with resolution and compatibility attributes associated with the contents. Post populating of the contents, the system may generate a final document for user.

15 Claims, 4 Drawing Sheets

(56) References Cited

U.S. PATENT DOCUMENTS

| | | | |
|---|---|---|---|
| 9,529,791 B1* | 12/2016 | Zheng | G06F 17/248 |
| 2003/0137545 A1* | 7/2003 | Hoehn | G06F 17/212 |
| | | | 715/838 |
| 2005/0155060 A1 | 7/2005 | Sato et al. | |
| 2006/0143082 A1 | 6/2006 | Ebert | |
| 2007/0066341 A1 | 3/2007 | Silverbrook et al. | |
| 2007/0220488 A1* | 9/2007 | Wheadon | G06F 17/211 |
| | | | 717/124 |
| 2007/0253027 A1* | 11/2007 | Hiebert | G03G 15/5087 |
| | | | 358/1.18 |
| 2008/0288861 A1* | 11/2008 | Jones | G06F 17/212 |
| | | | 715/253 |
| 2010/0211866 A1* | 8/2010 | Nicholas | G06F 17/212 |
| | | | 715/234 |
| 2010/0251092 A1* | 9/2010 | Sun | G06F 17/243 |
| | | | 715/222 |
| 2011/0270688 A1 | 11/2011 | Dew et al. | |
| 2011/0320933 A1* | 12/2011 | Sanami | G06F 17/212 |
| | | | 715/246 |
| 2012/0054095 A1* | 3/2012 | Lesandro | G06Q 20/10 |
| | | | 705/39 |
| 2012/0054140 A1* | 3/2012 | Shimizu | G06N 5/02 |
| | | | 706/46 |
| 2012/0054596 A1* | 3/2012 | Kroger | G06F 17/3089 |
| | | | 715/234 |
| 2012/0303697 A1* | 11/2012 | Alstad | G06F 16/9574 |
| | | | 709/203 |
| 2012/0324021 A1* | 12/2012 | Cao | H04L 51/30 |
| | | | 709/206 |
| 2013/0014008 A1* | 1/2013 | Damera-Venkata | G06F 17/212 |
| | | | 715/252 |
| 2013/0036113 A1* | 2/2013 | Damera-Venkata | G06F 17/211 |
| | | | 707/724 |
| 2013/0205199 A1* | 8/2013 | Damera-Venkata | G06F 17/248 |
| | | | 715/243 |
| 2015/0156342 A1* | 6/2015 | Fries | H04N 1/00411 |
| | | | 358/1.15 |
| 2015/0242008 A1* | 8/2015 | Beckman | G06F 3/043 |
| | | | 345/177 |
| 2015/0295996 A1* | 10/2015 | Peters | G06F 3/0481 |
| | | | 715/744 |
| 2017/0075876 A1* | 3/2017 | Whelan | G06F 17/3089 |
| 2018/0150446 A1* | 5/2018 | Sivaji | G06F 3/0482 |

OTHER PUBLICATIONS

Zhou et al., An Optimization-based Approach to Dynamic Data Content Selection in Intelligent Multimedia Interfaces, ACM 2004, pp. 227-236. (Year: 2004).*

* cited by examiner

METHOD OF OPTIMIZING SPACE UTILIZATION IN A DOCUMENT AND A SPACE OPTIMIZATION SYSTEM THEREOF

TECHNICAL FIELD

The present disclosure relates in general to space optimization technique. More particularly, but not exclusively, the present disclosure discloses a method and system for optimizing space utilization in a document.

BACKGROUND

Nowadays, electronic documents are rapidly replacing physical documents. Generation of the electronic documents are mostly based on templates related to a particular domain. For example, a template, in healthcare domain, includes various information like patient's name, address, phone number, treatment details and the like. Similarly, a template, in electricity billing domain, includes information like user number, billing unit, user address, bill amount and the like.

All this information requires some specific amount of space on the templates. Sometimes, volume or size of some information becomes so large that the templates, having predefined area for each information, are unable to accommodate all the information. Somehow, even if it gets managed manually, the readability of the information becomes a challenge. Thus, the fixed areas defined in the templates makes them non-flexible, and hence generating the documents in readable format becomes a challenge.

SUMMARY

The present disclosure relates to a method of optimizing space utilization in a document. The method comprises steps of receiving a template of the document. The template is divided into static space, dynamic space, and whitespace. The method further includes a step of fetching from a content database, one or more static contents corresponding to the static space, one or more dynamic contents corresponding to the dynamic space, and one or more personalized contents corresponding to the whitespace. The method further includes determining dynamic content size of the one or more dynamic contents, personalized content size of the one or more personalized contents, dynamic space size of the dynamic space, and whitespace size of the whitespace. Further, the method includes comparing the dynamic content size with the dynamic space size of the template and the personalized content size with the whitespace size of the template. The method further includes a step of performing, based on the comparison, resizing at least one of the dynamic content size and the dynamic space size relative to each other and resizing at least one of the personalized content size and the whitespace size relative to each other. Further, the method includes populating the one or more dynamic contents and one or more personalized contents, based on the resizing, in the dynamic space and the whitespace of the template respectively maintaining resolution and compatibility attributes associated with the one or more dynamic contents and one or more personalized contents. The method further includes populating the one or more static contents in the static space of the template.

Further, the present disclosure relates to space optimization system for optimizing space utilization in a document. The space optimization system comprises a processor and a memory communicatively coupled to the processor. The memory stores processor-executable instructions, which, on execution, causes the processor to perform one or more operations including receiving a template of the document. The template is divided into static space, dynamic space, and whitespace. The system fetches from a content database, one or more static contents corresponding to the static space, one or more dynamic contents corresponding to the dynamic space, and one or more personalized contents corresponding to the whitespace. Further, the system determines dynamic content size of the one or more dynamic contents, personalized content size of the one or more personalized contents, dynamic space size of the dynamic space, and whitespace size of the whitespace. The system compares the dynamic content size with the dynamic space size of the template and the personalized content size with the whitespace size of the template. The system performs, based on the comparison, resizing at least one of the dynamic content size and the dynamic space size relative to each other and resizing at least one of the personalized content size and the whitespace size relative to each other. Further, the system populates the one or more dynamic contents and one or more personalized contents, based on the resizing, in the dynamic space and the whitespace of the template respectively maintaining resolution and compatibility attributes associated with the one or more dynamic contents and one or more personalized contents. Further, the system populates the one or more static contents in the static space of the template.

Furthermore, the present disclosure relates to a non-transitory computer readable medium including instructions stored thereon that when processed by at least one processor cause a space optimization system to perform the acts of receiving a template of the document. The template is divided into static space, dynamic space, and whitespace. The space optimization system fetches from a content database, one or more static contents corresponding to the static space, one or more dynamic contents corresponding to the dynamic space, and one or more personalized contents corresponding to the whitespace. Further, the space optimization system determines dynamic content size of the one or more dynamic contents, personalized content size of the one or more personalized contents, dynamic space size of the dynamic space, and whitespace size of the whitespace. The space optimization system compares the dynamic content size with the dynamic space size of the template and the personalized content size with the whitespace size of the template. The space optimization system performs, based on the comparison, resizing at least one of the dynamic content size and the dynamic space size relative to each other and resizing at least one of the personalized content size and the whitespace size relative to each other. Further, the space optimization system populates the one or more dynamic contents and one or more personalized contents, based on the resizing, in the dynamic space and the whitespace of the template respectively maintaining resolution and compatibility attributes associated with the one or more dynamic contents and one or more personalized contents. Further, the space optimization system populates the one or more static contents in the static space of the template.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a space optimization system (alternatively also referred as "system") for optimizing space utilization in a document. Although, the method for optimizing the space utilization is described in conjunction with a server, the said method can also be implemented in various computing systems/devices, other than the server. Documents like electricity bill, healthcare reports, mobile bill and the like are generated which includes various types of information for intended user or recipient of the document. For example, in the healthcare reports, various types healthcare related information like patient's name, patient's address, treatment details and duration of the treatment are provided to a patient.

Since these documents are generated in bulk, templates are generally used. The templates may include different predefined fields for populating the information relevant to the user. As discussed above, in the healthcare domain, the different fields may include patient's name, patient's address, treatment details for populating the information. Once the information is populated in the templates, a final document gets generated and shared with the intended user. However, sometimes, the document generation becomes a tedious task due to volume or size of the information or content to be populated in the document. Since the templates have predefined areas allocated for the information/contents, accommodating a large content having a size greater than the allocated area or space in the template becomes a challenge. Even if somehow the contents are adjusted into the allocated space, another challenge of readability of the documents is faced by the users.

To overcome this challenge, the present disclosure provides the system and the method which enables accommodating of the contents in the template without compromising with their readability to the user. Generally, the templates are designed in such a manner that it has dedicated spaces for static contents, dynamic contents and personalized contents. However, according to an alternative embodiment, the template may have no predefined or dedicated spaces. In other words, at the time of inserting the contents, the system may determine specific space for a specific content in a real-time. For example, the system may determine a whitespace area or a free area for the inserting the personalized contents in the template.

The static contents may include those contents which remains unchanged in the document. On the contrary, the dynamic contents changes from one template to another template, or in other words, from one user to another. Considering an example of an electricity bill document, the static contents may include name of the service provider, helpdesk number, feedback email address and the like. Whereas, the dynamic contents may include user number, user name, bill amount, meter reading or any other information which may vary from one user to another user.

Further, the personalized contents may include some personalized information for the user which may be of user's interest. For example, for those users whose electricity bill comes more than ten thousand per month, a special offer of providing free servicing of their air conditioners may be generated. This special offer may be communicated to the user through the personalized content inserted into the document at the time of document creation. Thus, the document (i.e., electricity bill in this case) may be generated having all these three contents i.e., static contents, dynamic contents and personalized contents.

As discussed in above paragraphs that due to large size of the contents, adjusting the contents in respective specific area becomes a challenge. However, the system disclosed in the present disclosure overcomes these challenges by providing resizing of the predefined spaces allocated for contents. For example, if the size of the dynamic contents becomes too large to be accommodated in its dedicated space in the template, and also there are two personalized contents to be inserted, the system resizes the dedicated spaces in such a manner that the contents are placed in the template without compromising with its resolution or readability for the user. According to some embodiments, the resizing may be performed upon the contents accommodating them in their dedicated spaces. The resizing is explained in detail in subsequent paragraphs of the specification.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
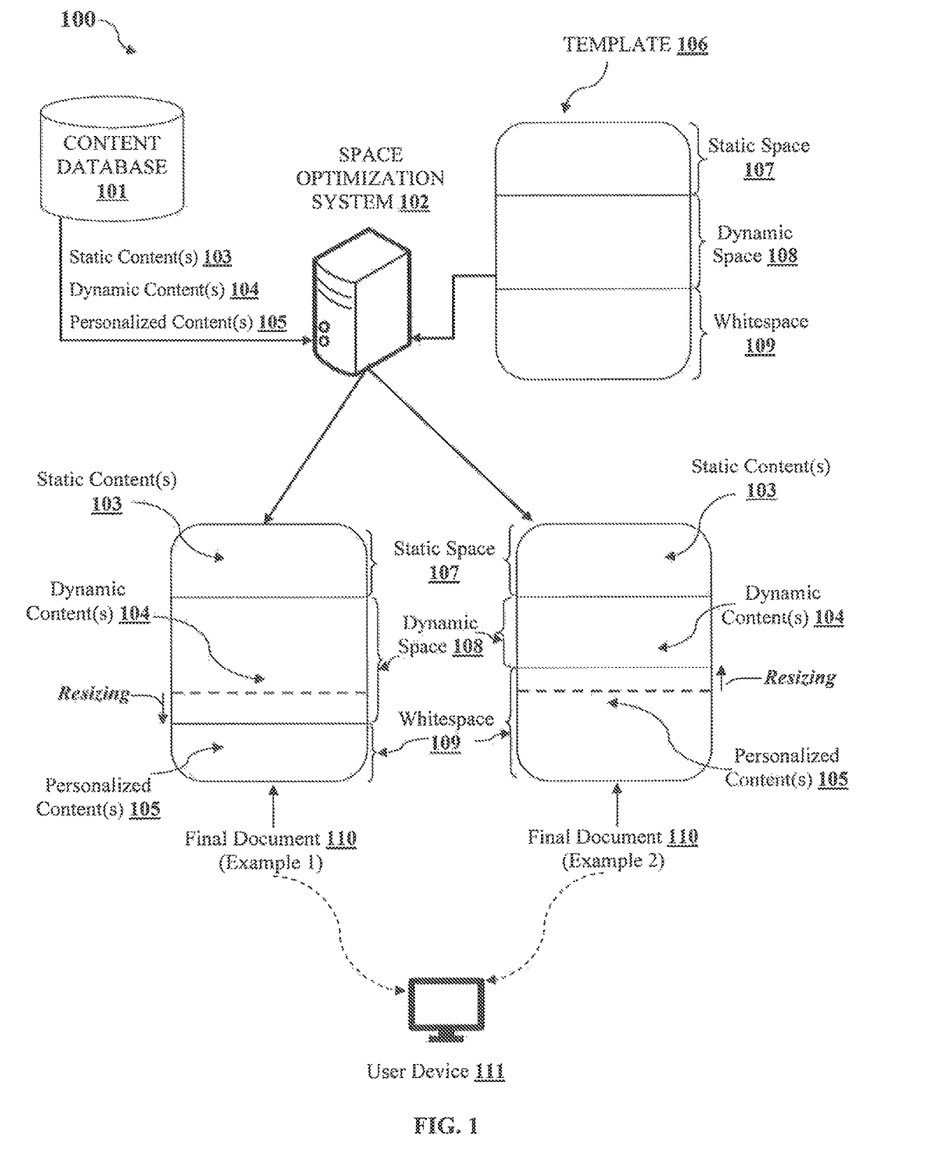
FIG. 1 shows an exemplary environment illustrating space optimization system for optimizing space utilization in a document in accordance with some embodiments of the present disclosure.

FIG. 1 shows an exemplary environment illustrating a space optimization system for optimizing space utilization in a document.

The environment 100 includes a content database 101, a space optimization system 102, and a template 106. The content database 101 may include one or more static contents 103, one or more dynamic contents 104, and one or more personalized contents 105. According to embodiments, the content database 101 may be external to the space optimization system 102 or as a part of the space optimization system 102. Further, the template 106 may be divide into a static space 107, a dynamic space 108 and a whitespace 109.

The space optimization system 102 receives the one or more static contents 103, the one or more the dynamic contents 104, and the one or more personalized contents 105 from the content database 101. The space optimization system 102 may further receive the template 106 for generating a document. The space optimization system 102 further evaluates the sizes of the received contents (103, 104 and 105) and sizes of spaces i.e., the static space 107, the dynamic space 108 and the whitespace 109 available in the template 106. Post determining the sizes, the space optimization system 102 may compare the sizes and resize at least one of the dynamic space 108, the whitespace 109, dynamic contents 104 and the personalized contents 105 based on the comparison, which is explained in detail in upcoming paragraphs of the specification.

As shown in FIG. 1, two examples of the final documents are provided for better understanding. In example 1 (i.e., left hand side in FIG. 1), the final document 110 is generated by resizing the dynamic space 108 in relative to the whitespace 109 or in relative to the dynamic content 104. The resizing means decreasing or increasing the spaces or contents. The arrow in downward direction indicates the direction of the resizing (increasing the size) of the dynamic space 108. However, resizing may also be performed on the dynamic contents 104 in order to suitably accommodate them inside the provided dynamic space 108 area. In example 2 (i.e., right hand side in FIG. 1), the final document 110 is generated by resizing the whitespace 109 in relative to the dynamic space 108 or in relative to the personalized contents 105. The arrow in upward direction indicates the direction of the resizing (increasing the size) of the whitespace 109. In an embodiment, resizing may be performed on the personalized contents 105 to suitably accommodate them inside the provided whitespace 109 area of the final document 110. For example, the resizing of the personalized contents 105 is performed such that an ideal fit or a best fit of the personalized contents 105 are determined in relative to the whitespace 109 area of the template 106.

Figure 2:
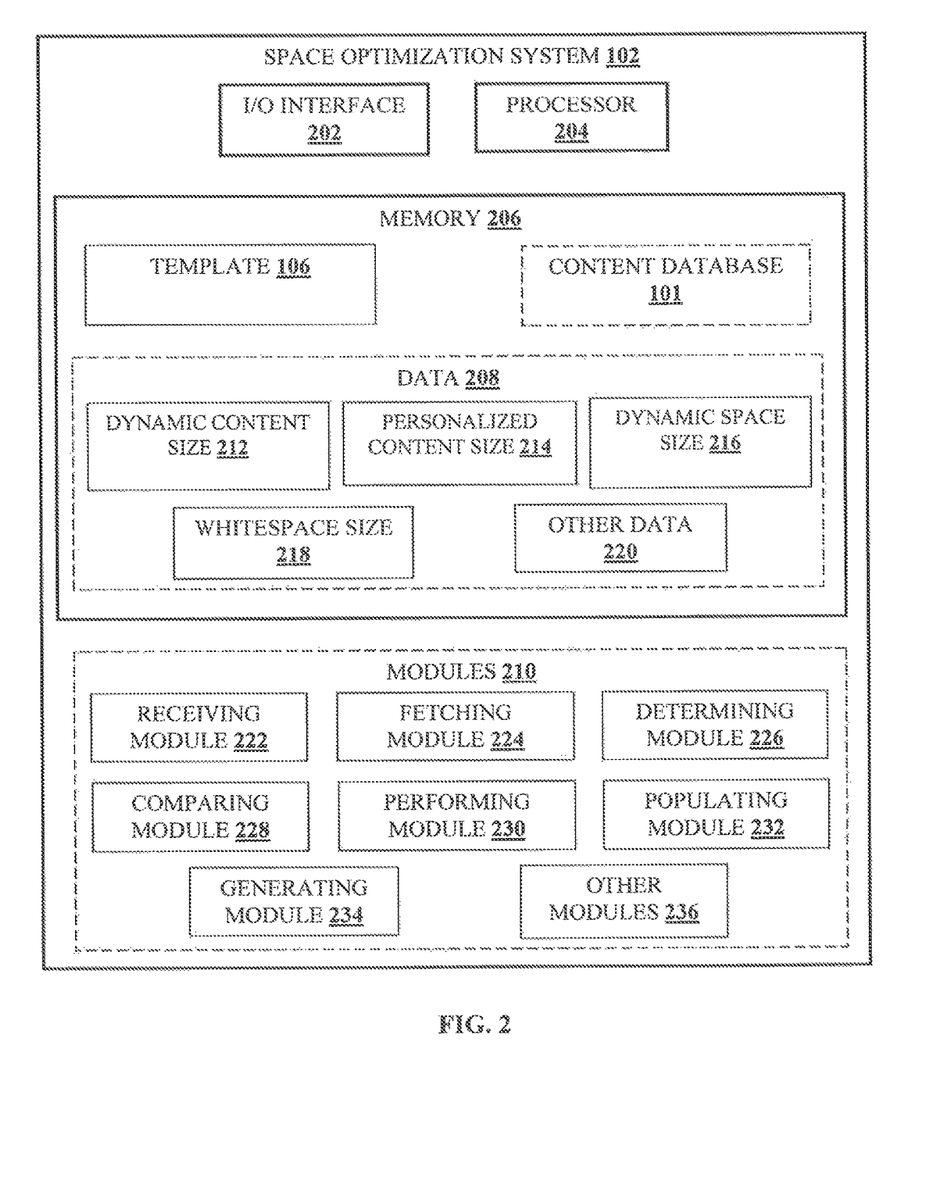
FIG. 2 shows a detailed block diagram illustrating the space optimization system in accordance with some embodiments of the present disclosure.

FIG. 2 shows a detailed block diagram illustrating the space optimization system in accordance with some embodiments of the present disclosure.

The space optimization system 102 includes an I/O interface 202, a processor 204, and a memory 206. The I/O interface 202 is configured to receive template 106 and the one or more static contents 103, the one or more the dynamic contents 104, and the one or more personalized contents 105. The memory 206 is communicatively coupled to the processor 204. The processor 204 is configured to perform one or more functions of the space optimization system 102 for optimizing space utilization in a document. In one implementation, the space optimization system 102 includes data 208 and modules 210 for performing various operations in accordance with the embodiments of the present disclosure. The memory 206 may further include a template 106 and may also include the content database 101. In an embodiment, the data 208 may include, without limitation, dynamic content size 212, personalized content size 214, dynamic space size 216, whitespace size 218, and other data 220.

In one embodiment, the data 208 may be stored within the memory 206 in the form of various data structures. Additionally, the aforementioned data 208 can be organized using data models, such as relational or hierarchical data models. The other data 220 may store data, including temporary data and temporary files, generated by modules 210 for performing the various functions of the space optimization system 102.

In an embodiment, the template 106 may be divided into static space 107, dynamic space 108, and whitespace 109. In an embodiment, the data 208 may be processed by one or more modules 210. In one implementation, the one or more modules 210 may also be stored as a part of the processor 204. In an example, the one or more modules 210 may be communicatively coupled to the processor 204 for performing one or more functions of the space optimization system 102.

In one implementation, the one or more modules 210 may include, without limitation, a receiving module 222, a fetching module 224, a determining module 226, a comparing module 228, a performing module 230, a populating module 232, a generating module 234, and other modules 236. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

The present disclosure is related to template based document generation. The requirement of the templates arises when the documents are generated in bulk or in bundle, for example, the healthcare report document or the electricity bill document. In both the documents, different information or contents are required to be filled at specific areas allocated in the template. Some of the information may remain same (static content) and some of the information may change or vary (dynamic) from document to document. Thus, in first step, the receiving module 222 may receive a template 106 of the document. The template 106 received may be divided into a static space 107, a dynamic space 108, and a whitespace 109. The division of the template 106 are done to fill different information/content associated with a particular domain. However, according to an alternative embodiment, there may be no division of the spaces in the template 106. At the time of inserting the contents, the space optimization system 102 may determine a space in the template 106. For example, the space optimization system 102 may determine the whitespace 109 area in the template 106 for inserting the personalized contents 105.

Now once the template 106 is received, the fetching module 224 of the space optimization system 102 may fetch, from the content database 101, one or more static contents 103 corresponding to the static space 107, one or more dynamic contents 104 corresponding to the dynamic space 108, and one or more personalized contents 105 corresponding to the whitespace 109. For example, in the healthcare report document, information such as hospital name, hospital helpdesk number, hospital email address remains same i.e., the static contents 103, whereas information like patient's name, patient's address, patient's registration number, treatment details (i.e., dynamic contents 104) varies from one document to another document. Similarly, in the electricity bill document, information like name of electricity board, helpline number and email address for providing feedback remains same, whereas information like user name, user billing number, user address, meter reading and bill amount changes from one user to another.

Apart from the static content 103 and the dynamic content 104, there may be other information or content also which may be inserted into the template 106. The other content is the personalized content 105 which may be of user's interest. The personalized content 105 may contain a specific offer for the users. According to the embodiments of present disclosure, the personalized contents 105 may be based on information provided in the dynamic content 104. For example, if the bill amount (i.e., dynamic content 104) of any particular user is more than ten thousand per month for three consecutive months, a specific offer may be given to that user. The offer may include providing free servicing to his/her electronic components like an air-conditioners or a refrigerator. The specific offer may be in a text format or an image format, for example an advertisement image. The specific offer is an example of the personalized content 105 which is received, by the user, when the document is generated. However, before generating the document, the contents (static content 103, dynamic content 104 and personalized content 105) are required to be properly fitted into the spaces available in the template 106. As discussed in the problem statement, that the volume or size of the contents becomes an issue while generating the documents. Sometimes, the size of the contents becomes so large, that it becomes difficult to adjust the contents into their specified areas of the template 106. Thus, a space constraint issue arises while generating the documents.

Thus, the present disclosure focusses on providing flexibility in the template 106 so that contents may get suitably fitted inside the template 106. To provide such flexibility, in next step, the determining module 226 of the space optimization system 102 may determine the size of the contents to be inserted into the template 106 as well as the size of the spaces available in the template 106. For example, the determining module 226 may determine dynamic content size 212 i.e., the size of the dynamic contents 104, and a personalized content size 214 i.e., the size of the personalized contents 105. Similarly, the determining module 226 may also determine dynamic space size 216 i.e., size of the dynamic space 108, and whitespace size 218 i.e., the size of the whitespace 109 area available in the template 106. According to an embodiment, the dynamic content size 212, the personalized content size 214, the dynamic space size 216, and the whitespace size 218 may be determined based on number of characters in a horizontal direction and a vertical direction.

Now once the sizes are determined, the comparing module 228 of the space optimization system 102 starts the comparison of the contents with their respective spaces. The comparison is performed to check whether the contents (with their current size) may be properly adjusted into the available space of the template 106. For example, the comparing module 228 may compare the dynamic content size 212 with the dynamic space size 216 of the template 106 to check whether the dynamic contents 104 may be adjusted into the dynamic space 108. Similarly, the comparing module 228 may compare the personalized content size 214 with the whitespace size 218 of the template 106 to check whether the personalized contents 105 may be adjusted into the whitespace 109 area.

The comparison may help the space optimization system 102 understand about how well the contents (dynamic contents 104 and personalized contents 105) may fit inside their available spaces (dynamic space 108 and whitespace 109) in the template 106 without compromising with its readability to the users. The comparison also helps the space optimization system 102 decide about solutions when the contents (with their current size) are not able to fit inside their available space in the template 106. The solution may include resizing of the contents or spaces relative to each other so that contents may fit inside the space provided in the template 106. Further, another solution may also include generating different size-variants of the contents and selecting one of them, based on their size, for generating the document. Both the solutions are explained in detail in subsequent paragraphs of the specification.

According to an embodiment, the performing module 230 may not only perform the resizing of the contents, but also it resizes the available spaces in the template 106. The objective of such resizing is to comfortably fit the contents in the spaces, thereby optimizing the utilization of the spaces in the template 106. Consider an example when the dynamic content 104 may not be able to fit, due to its current size, inside the dynamic space 108 available for the dynamic content 104. Such situation may occur when, for example, at the time of generating the electricity bill document, the size of the dynamic contents 104 like user name and user address becomes so long that it crosses the limit of the size available in the dynamic space 108 i.e., the dynamic space size 216. In other words, the dynamic content size 212 becomes greater than the dynamic space size 216.

In this situation, either the dynamic content 104 may get resized (i.e., size of the dynamic content is decreased) or dynamic space 108 get resized (i.e., size of the dynamic space is increased). The decreasing or increasing of the sizes of the dynamic content 104 and the dynamic space 108 may be relative to each other. However, before decreasing the size of the dynamic content 104 or before increasing the size of the dynamic space 108, the performing module 230 may also check whitespace's 109 capability of accommodating the personalized contents 105 with the current size of the personalized contents 105.

In one scenario, if the whitespace 109 is capable enough for accommodating the personalized contents 105 and still some space is left inside the whitespace 109, the performing module 230 may consider that space (left after accommodating the personalized content) of the whitespace 109 while resizing the dynamic space 108. In other words, the size of the dynamic space 108 is increased to a certain limit which is based on the space left inside the whitespace 109.

However, according to another scenario, it may happen that the whitespace 109 may not be capable enough of accommodating the personalized contents 105. It may be either due to the oversize of the personalize contents 105 or quantity of the personalized contents 105. Now in this scenario, at one hand, the performing module 230 may perform the resizing (decreasing) the size of personalized contents 105 as well as resizing (increasing) the size of the whitespace 109 relative to each other. Whereas, on other hand, the performing module 230 may also simultaneously perform the resizing (decrease) the size the dynamic contents 104 as well as resizing (decreasing) the size of the dynamic space 108 relative to each other. In second case, the resizing (decreasing) the size of the dynamic space 108 may be also relative to the resizing (increasing) the size of the whitespace 109. The proportion of the resizing (i.e., increasing and decreasing) of the contents as well as the spaces are performed in real-time is such a manner that resolution and compatibility attributes of the contents are still maintained. The compatibility attributes may include font size and font style associated with the dynamic contents 104 and the personalized contents 105.

Now once the resizing is performed, the populating module 232 of the space optimization system 102 may populate the static contents 103, the dynamic contents 104, and the personalized contents 105 into the static space 107, the dynamic space 108 and the whitespace 109 respectively. This way, the space optimization system 102 may optimize the overall space utilization of the template 106. Based on the populating, the generating module 234 may generate a final document 110 having all the contents suitably placed in their areas and readable for the users. Further, the space optimization system 102 may transmits the generated final document 110 to a user-device 111 of an intended recipient of the final document 110.

However, according to an alternative embodiment, the space optimization system 102 may provide another solution for optimizing the space utilization in the document. According to this embodiment, the generating module 234 may generate plurality of size-variants of the plurality of personalized contents 105 based on the compatibility attributes associated with the plurality of personalized contents 105. The plurality of size-variants indicates one or more sizes of the plurality of personalized contents 105.

Post generating the plurality of size-variants, the comparing module 228 may compare a size-variant, having a minimum size, of one of a personalized content (i.e., first personalized content) of the plurality of personalized contents 105, with the whitespace size 218. If the size-variant having the minimum size is greater than the whitespace size 218, the performing module 230 may resize the whitespace size 218 in relative to the minimum size of the first personalized content. Based on such resizing, the populating module 232 may populate the first personalized content into the whitespace 109 area of the template 106.

However, if the size-variant having the minimum size is lesser than the whitespace size 218, the determining module 226 of the space optimization system 102 may determine whether any second personalized content is applicable for being inserted in the whitespace 109 area. The second personalized content may be determined amongst the plurality of the personalized contents 105.

When no second personalized content is applicable, the performing module 230 may select a size-variant of the first personalized content, from the plurality of size-variants, having an optimal size in relative to the whitespace size 218 of the whitespace 109 area. Post selecting the optimal size, the populating module 232 may populate the first personalized content (having the optimal size) into the whitespace 109.

However, if the second personalized content is applicable to be inserted, the performing module 230 may select two size-variants having the minimum size i.e., one minimum size variant for the first personalized content and another minimum size variant for the second personalized content. Post selecting the two size-variants, the populating module 232 may populate the first personalized content and the second personalized content into the whitespace 109. Thus, based on the populating, the generating module 234 may generate the final document 110.

Figure 3:
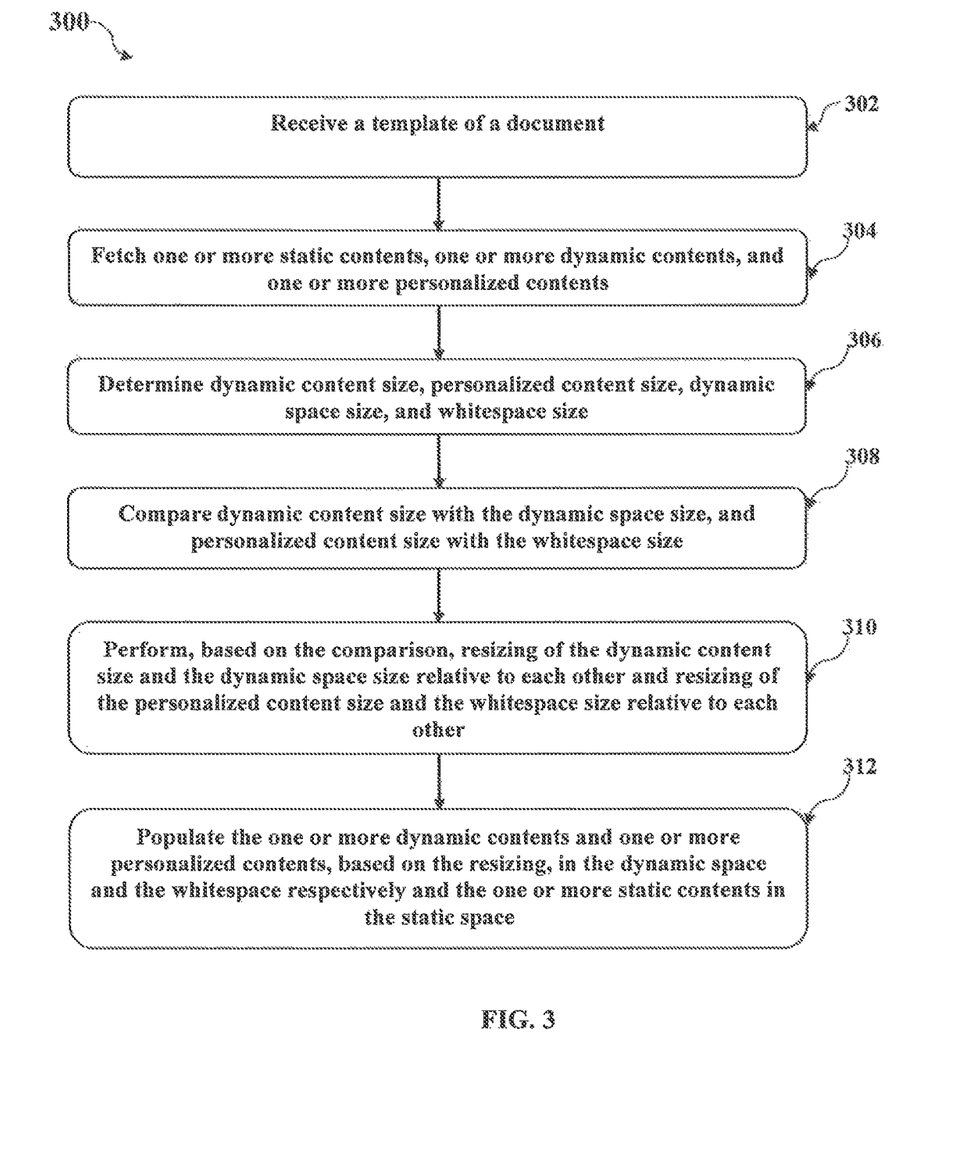
FIG. 3 shows a flowchart illustrating a method of optimizing space utilization in a document in accordance with some embodiments of the present disclosure.

FIG. 3 shows a flowchart illustrating a method optimizing space utilization in a document in accordance with some embodiments of the present disclosure.

As illustrated in FIG. 3, the method 300 includes one or more blocks for optimizing space utilization in the document using space optimization system 102. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 302, the space optimization system 102 may receive a template 106 of the document. The template 106 is divided into static space 107, dynamic space 108, and whitespace 109.

At block 304, the space optimization system 102 may fetch, from a content database 101, one or more static contents 103 corresponding to the static space 107, one or more dynamic contents 104 corresponding to the dynamic space 108, and one or more personalized contents 105 corresponding to the whitespace 109.

At block 306, the space optimization system 102 may determine dynamic content size 212 of the one or more dynamic contents 104, personalized content size 214 of the one or more personalized contents 105, dynamic space size 216 of the dynamic space 108, and whitespace size 218 of the whitespace 109.

At block 308, the space optimization system 102 may compare the dynamic content size 212 with the dynamic space size 216 of the template 106, and the personalized content size 214 with the whitespace size 218 of the template 106.

At block 310, the space optimization system 102 may perform resizing of at least one of the dynamic content size 212 and the dynamic space size 216 relative to each other, and of at least one of the personalized content size 214 and the whitespace size 218 relative to each other.

At block 312, the space optimization system 102 may populate the one or more dynamic contents 104 and one or more personalized contents 105, based on the resizing, in the dynamic space 108 and the whitespace 109 of the template 106 respectively maintaining resolution and compatibility attributes associated with the one or more dynamic contents 104 and one or more personalized contents 105. The space optimization system 102 further populates the one or more static contents 103 in the static space 107 of the template 106.

Computer System

Figure 4:
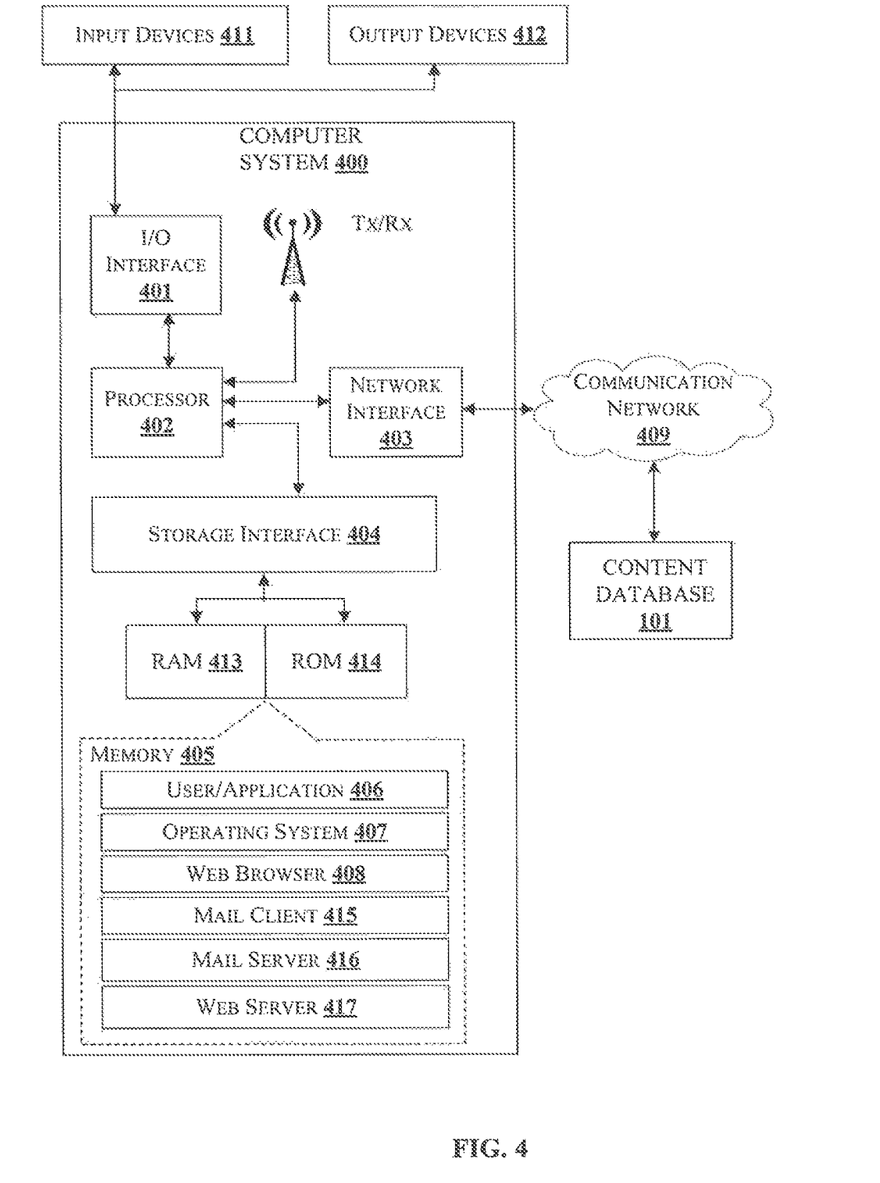
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 can be the space optimization system 102 which is used for optimizing space utilization in a document. According to an embodiment, the computer system 400 may receive a template 106 from an external source and may fetch one or more static contents 103, one or more dynamic contents 104, and one or more personalized contents 105 from a content database 101. The computer system 400 may comprise a central processing unit ("CPU" or "processor") 402. The processor 402 may comprise at least one data processor for executing program components for executing user-generated or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data 406, an operating system 407, web browser 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. I/O interface 401 may facilitate display, execution, interaction, manipulation, or operation of program components through textual or graphical facilities. For example, I/O interface may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 400 may implement a web browser 408 stored program component. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server 416 stored program component. The mail server 416 may be an Internet mail server such as Microsoft Exchange, or the like. The mail server 416 may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client 415 stored program component. The mail client 415 may be a mail viewing application, such as Apple Mail, Microsoft Entourage, Microsoft Outlook, Mozilla Thunderbird, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method of optimizing the space utilization in the document.

In an embodiment, the method of present disclosure maintains the resolution and compatibility attributes associated with the contents while generating the documents.

In an embodiment, the present disclosure automatically decides the optimum place in the document for the personalized content.

In an embodiment, the present disclosure performs space utilization for all the documents in a single batch process.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| REFERENCE NUMBER | DESCRIPTION |
| --- | --- |
| 100 | ENVIRONMENT |
| 101 | CONTENT DATABASE |
| 102 | SPACE OPTIMIZATION SYSTEM |
| 103 | STATIC CONTENT(S) |
| 104 | DYNAMIC CONTENT(S) |
| 105 | PERSONALIZED CONTENT(S) |
| 106 | TEMPLATE |
| 107 | STATIC SPACE |
| 108 | DYNAMIC SPACE |
| 109 | WHITESPACE |
| 110 | FINAL DOCUMENT |
| 111 | USER DEVICE |
| 202 | I/O INTERFACE |
| 204 | PROCESSOR |
| 206 | MEMORY |
| 208 | DATA |
| 210 | MODULES |
| 212 | DYNAMIC CONTENT SIZE |
| 214 | PERSONALIZED CONTENT SIZE |
| 216 | DYNAMIC SPACE SIZE |
| 218 | WHITESPACE SIZE |
| 220 | OTHER DATA |
| 222 | RECEIVING MODULE |
| 224 | FETCHING MODULE |
| 226 | DETERMINING MODULE |
| 228 | COMPARING MODULE |
| 230 | PERFORMING MODULE |
| 232 | POPULATING MODULE |
| 234 | GENERATING MODULE |
| 236 | OTHER MODULES |
| 400 | COMPUTER SYSTEM |
| 401 | I/O INTERFACE |
| 402 | PROCESSOR |
| 403 | NETWORK INTERFACE |
| 404 | STORAGE INTERFACE |
| 405 | MEMORY |
| 406 | USER/APPLICATION |
| 407 | OPRRATING SYSTEM |
| 408 | WEB BROWSER |
| 409 | COMMUNICATION NETWORK |
| 411 | INPUT DEVICES |
| 412 | OUTPUT DEVICES |
| 413 | RAM |
| 414 | ROM |
| 415 | MAIL CLIENT |
| 416 | MAIL SERVER |
| 417 | WEB SERVER |

The invention claimed is:

1. A method of optimizing space utilization in a document, the method comprising:
   receiving, by a space optimization system, a template of the document, wherein the template is divided into static space, dynamic space, and whitespace;
   fetching, by the space optimization system, from a content database, one or more static contents corresponding to the static space, one or more dynamic contents corresponding to the dynamic space, and one or more personalized contents corresponding to the whitespace;
   determining, by the space optimization system, dynamic content size of the one or more dynamic contents, personalized content size of the one or more personalized contents, dynamic space size of the dynamic space, and whitespace size of the whitespace;
   comparing, by the space optimization system, the dynamic content size with the dynamic space size of the template, and the personalized content size with the whitespace size of the template;

performing, by the space optimization system, based on the comparison,
  (i) resizing at least one of the dynamic content size and the dynamic space size relative to each other, and
  (ii) resizing at least one of the personalized content size and the whitespace size relative to each other, wherein resizing of the dynamic space in step (i) and the whitespace in step (ii) are relative to each other;

populating, by the space optimization system,
  the one or more dynamic contents and one or more personalized contents, based on the resizing, in the dynamic space and the whitespace of the template respectively maintaining resolution and compatibility attributes associated with the one or more dynamic contents and one or more personalized contents, and the one or more static contents in the static space of the template;

generating, the space optimization system,
  a plurality of size-variants of the one or more personalized contents based on the compatibility attributes associated with the one or more personalized contents, wherein the plurality of size-variants indicates one or more sizes of the one or more personalized contents;

comparing, by the space optimization system,
  a size variant, having a minimum size, of a first personalized content of the one or more personalized contents with the whitespace size;

if the size-variant having the minimum size is greater than the whitespace size;
  resizing the whitespace size in relative to the minimum size of the first personalized content, and populating the first personalized content into the whitespace based on the resizing of the whitespace size;

else if the size-variant having the minimum size is lesser than the whitespace size:
  determining a second personalized content, applicable for being inserted in the whitespace; and if no second personalized content is applicable:
  selecting a size-variant of the first personalized content, from the plurality of size-variants, having an optimal size in relative to the whitespace size of the whitespace, and populating the first personalized content having the optimal size into the whitespace.

2. The method as claimed in claim 1, further comprising generating a final document based on the populating.

3. The method as claimed in claim 2, wherein the final document is transmitted to a device of an intended recipient of the final document.

4. The method as claimed in claim 1, wherein the compatibility attributes comprise font size and font style associated with the one or more dynamic contents and the one or more personalized contents.

5. The method as claimed in claim 1, wherein the dynamic content size, the personalized content size, the dynamic space size, and the whitespace size are determined based on number of characters in a horizontal direction and a vertical direction.

6. A space optimization system for optimizing space utilization in a document, the system comprising:
  a processor; and
  a memory communicatively coupled to the processor, wherein the memory stores processor-executable instructions, which, on execution, causes the processor to:
  receive a template of the document, wherein the template is divided into static space, dynamic space, and whitespace;
  fetch, from a content database, one or more static contents corresponding to the static space, one or more dynamic contents corresponding to the dynamic space, and one or more personalized contents corresponding to the whitespace;
  determine, dynamic content size of the one or more dynamic contents, personalized content size of the one or more personalized contents, dynamic space size of the dynamic space, and whitespace size of the whitespace;
  compare, the dynamic content size with the dynamic space size of the template, and the personalized content size with the whitespace size of the template;
  perform, based on the comparison,
    (i) resizing at least one of the dynamic content size and the dynamic space size relative to each other, and
    (ii) resizing at least one of the personalized content size and the whitespace size relative to each other, wherein resizing of the dynamic space in step (i) and the whitespace in step (ii) are relative to each other;
  populate, the one or more dynamic contents and one or more personalized contents, based on the resizing, in the dynamic space and the whitespace of the template respectively maintaining resolution and compatibility attributes associated with the one or more dynamic contents and one or more personalized contents, and the one or more static contents in the static space of the template;
  generate, plurality of size-variants of the one or more personalized contents based on the compatibility attributes associated with the one or more personalized contents, wherein the plurality of size-variants indicates one or more sizes of the one or more personalized contents;
  compare, a size-variant, having a minimum size, of, a first personalized content of the one or more personalized contents, with the whitespace size;
  if the size-variant having the minimum size is greater than the whitespace size;
    resizing the whitespace size in relative to the minimum size of the first personalized content, and populating the first personalized content into the whitespace based on the resizing of the whitespace size;
  else if the size-variant having the minimum size is lesser than the whitespace size;
    determining a second personalized content, applicable for being inserted in the whitespace;
  if no second personalized content is applicable:
    selecting a size-variant of the first personalized content, from the plurality of size-variants, having an optimal size in relative to the whitespace size of the whitespace, and populating the first personalized content having the optimal size into the whitespace.

7. The space optimization system as claimed in claim 6, wherein the processor is further configured to generate a final document based on the populating.

8. The space optimization system as claimed in claim 7, wherein the final document is transmitted to a device of an intended recipient of the final document.

9. The space optimization system as claimed in claim 6, wherein the compatibility attributes comprise font size and font style associated with the one or more dynamic contents and the one or more personalized contents.

10. The space optimization system as claimed in claim 6, wherein the dynamic content size, the personalized content size, the dynamic space size, and the whitespace size are determined based on number of characters in a horizontal direction and a vertical direction.

11. A non-transitory computer-readable storage medium including instructions stored thereon that when processed by at least one processor causes a space optimization system to perform operations comprising:
   receiving a template of a document, wherein the template is divided into static space, dynamic space, and whitespace;
   fetching, from a content database, one or more static contents corresponding to the static space, one or more dynamic contents corresponding to the dynamic space, and one or more personalized contents corresponding to the whitespace;
   determining, dynamic content size of the one or more dynamic contents,
personalized content size of the one or more personalized contents, dynamic space size of the dynamic space, and whitespace size of the whitespace;
   comparing, the dynamic content size with the dynamic space size of the template, and the personalized content size with the whitespace size of the template;
   performing, based on the comparison,
      (i) resizing at least one of the dynamic content size and the dynamic space size relative to each other, and
      (ii) resizing at least one of the personalized content size and the whitespace size relative to each other, wherein resizing of the dynamic space in step (i) and the whitespace in step (ii) are relative to each other;
   populating, the one or more dynamic contents and one or more personalized contents, based on the resizing, in the dynamic space and the whitespace of the template respectively maintaining resolution and compatibility attributes associated with the one or more dynamic contents and one or more personalized contents, and the one or more static contents in the static space of the template;
   generating, a plurality of size-variants of the one or more personalized contents based on the compatibility attributes associated with the one or more personalized contents wherein the plurality of size-variants indicates one or more sizes of the one or more personalized contents;
   comparing, a size-variant, having a minimum size, of a first personalized content of the one or more personalized contents, with the whitespace size;
   if the size-variant having the minimum size is greater than the whitespace size:
      resizing the whitespace size in relative to the minimum size of the first personalized content, and populating the first personalized content into the whitespace based on the resizing of the whitespace size;
   else if the size-variant having the minimum size is lesser than the whitespace size;
      determining second personalized content, applicable for being inserted the whitespace;
   if no second personalized content is applicable:
      selecting a size-variant of the first personalized content, from the plurality, of size-variants, having an optimal size in relative to the whitespace size of the whitespace, and populating the first personalized content having the optimal size into the whitespace.

12. The medium as claimed in claim 11, wherein the instructions further cause the at least processor to generate a final document based on the populating.

13. The medium as claimed in claim 12, wherein the final document is transmitted to a device of an intended recipient of the final document.

14. The medium as claimed in claim 11, wherein the compatibility attributes comprise font size and font style associated with the one or more dynamic contents and the one or more personalized contents.

15. The medium as claimed in claim 11, wherein the dynamic content size, the personalized content size, the dynamic space size, and the whitespace size are determined based on number of characters in a horizontal direction and a vertical direction.

* * * * *